United States Patent [19]
Crary

[11] 3,862,331
[45] Jan. 21, 1975

[54] PROCESS FOR TREATING THE SKIN FOR RELIEVING SYMPTOMS CAUSED BY POISON IVY AND POISON OAK

[76] Inventor: Ely J. Crary, 437 St. Mary's Ln., Marietta, Ga. 30060

[22] Filed: Apr. 13, 1973

[21] Appl. No.: 350,702

[52] U.S. Cl. .............................................. 424/331
[51] Int. Cl............................................ A61k 27/00
[58] Field of Search .................................... 424/331

[56] References Cited
UNITED STATES PATENTS
3,445,564   5/1969   Kirschner........................... 424/331

OTHER PUBLICATIONS
Malten et al., Chem. Abstracts 69: 65818s.
Reminton's Pharm. Sciences 13th pp. 525–537 (1965).
Handbook of Non-Prescription Drugs, 1973 Edition, pp. 172–175.
Lindenberg et al., Chem. Abstracts 51: 15896c.
Wurster et al., Chem. Abstracts 63: 2246a.
Munies et al., Chem. Abstracts 63: 13910g.
Josten et al., Chem. Abstracts 75: 140262k.

*Primary Examiner*—Albert T. Meyers
*Assistant Examiner*—Norman A. Drezin
*Attorney, Agent, or Firm*—Newton, Hopkins & Ormsky

[57] ABSTRACT

A process for treating the skin and relieving symptoms caused by poison ivy and poison oak which comprise topically applying 2-butanone to the affected skin area.

4 Claims, No Drawings

PROCESS FOR TREATING THE SKIN FOR RELIEVING SYMPTOMS CAUSED BY POISON IVY AND POISON OAK

BACKGROUND OF THE INVENTION

This invention relates to a treatment process for hypersensitivity in man, and more particularly, to a process for treating the contact skin lesions caused by poison ivy and poison oak.

Hypersensitivity is an abnormal reactivity in man and animals to substances induced to the body by exposure through injection, inhalation, ingestion or contact. This substance, called allergen, or antigen, becomes responsible for the occurrence of a chain of reactions known as the allergic reaction.

There are two catagories of hypersensitivity, immediate and delayed. The two types differ in the period for occurrence of reactions in already sensitized subjects and depend upon the combination of circulating antibodies with allergen.

Delayed hypersensitivity frequently results from infections and from exposure of skin to certain noninfectious agents. Noninfectious hypersensitivity of the delayed type is exemplified by the contact sensitivities resulting from exposure to the skin to a variety of plants and chemical substances. Examples of this type of hypersensitivity include poison ivy and poison oak.

Skin reactions caused by poison ivy and poison oak are believed to be allergic reactions of the body to an ingredient of these plants. This ingredient is believed to be an oil soluble substance called rheus olin. When rheus olin comes in contact with the skin of a sensitive individual, it is dissolved by the oils of the skin and carried into the outer layers of the skin. When the rheus olin is dissolved, it starts a body reaction that is known as an allergic response. In the case of rheus olin, this begins with itching in the contacted area. The itching is followed by redness of the skin. The redness (rubor) of the skin is followed by a raised area (macular and papular) and this red raised area grows in size as the allergic reaction develops, until a water-like blister (vesicular and bullous) develops. In days to weeks, the water-like blister gradually subsides or is broken, and the skin gradually returns to normal. The skin remains normal until another exposure to the rheus olin occurs. The abovementioned process is known medically as rubor, erythema, macular, papular, vesicular and bullous reactions, all or any of which may occur in allergic response to poison ivy or poison oak.

SUMMARY OF THE INVENTION

An effective treatment of skin lesions and symptoms caused by poison ivy and poison oak has been found to be the topical application of 2-butanone in a concentration and amount sufficient to relieve the accompanying symptoms and to promote prompt healing of the lesions. The application may be accomplished by means of a saturated absorbent applicator or by means of the 2-butanone being added to various carrying vehicles.

DESCRIPTION OF THE ILLUSTRATIVE EMBODIMENT

Methyl ethyl ketone is a widely used industrial solvent. It is a colorless liquid and can be recognized by its characterisitic odor which is somewhat similar to acetone, but slightly more irritating.

Publications, such as the toxicology study on methyl ethyl ketone prepared by the Industrial Medicine and Toxicology Department of Union Carbide Corporation and the Hygenic Guide Series on methyl ethyl ketone prepared by the Industrial Hygene Association, indicate that the toxicity of the substance is very low. Prolonged or repeated contact with the skin should be avoided; however, such prolonged contact with the skin with the methyl ethyl ketone is not necessary in the treatment procedure of the present invention, as indicated herein below. Also, there is some experimental data available which supports the contention that methyl ethyl ketone is absorbed poorly through skin (Smyth, 1962).

The following is a treatment procedure in a limited clinical study using 2-butanone for skin lesions resulting from exposure to poison ivy or poison oak: A felt or cotton pad (3.5 cm. × 3 cm.), which is identical to those used presently in pre-packaged alcohol swabs, was saturated with industrial grade 2-butanone or methyl ethyl ketone. The pad saturated with 2-butanone was lightly patted and rubbed on the affected poisosn ivy or poison oak skin areas. The fingers were used to hold the pad. A drying and whitening of the treated area was immediately noted. All patients claimed immediate relief of itching and discomfort from the treated affected area.

Types of lesions trated were those caused by reaction to poison ivy and poison oak. For the sake of simplicity, the lesions were divided into three different classifications by appearance:

| | |
|---|---|
| Group I | Itching erythematous flat lesions; |
| Group II | Itching erythematous raised lesions - macules papules; and |
| Group III | Itching erythematous, vesicular, bullous and weeping lesions. |

Groups I and II cleared in twenty-four hours after one application of the 2-butanone. Group III cleared after seventy-two hours after three applications. Some lesions within Group III took ninety-six hours for clearing. All groups responded with immediate relief to itching. No secondary reactions nor sloughing of treated areas were noted in any of the groups.

The total number of cases treated was 21, of which three were adults, 10 were teenagers and 8 were children. Nineteen cases had Groups I and II and two cases had groups II and III.

The surface of hands, arms, legs, trunk, face and neck were treated. No surface area greater than that of a total of the body surface of the trunk was treated at any one time.

As many as ten pads saturated with the 2-butanone have been used at one time to cover the affected area. One of Group III was treated with a saturated pad and one was treated using a Q-TIP (a cotton swab) by dipping it in a bottle of 2-butanone.

In summary, all patients with itching poison ivy and poison oak lesions responded with immediate relief of all symptoms. Healing followed promptly. No adverse reactions nor complications resulted from the treatment.

This chemical could be packaged in single unit doses similar to the alcohol swabs used in hospitals. This would be done to limit the possible fire hazard that does exist with 2-butanone.

Additionally, the 2-butanone could be added to various carrying vehicles, such as vanishing creams and oleagenous bases like lanolin.

If desired, the 2-butanone may be diluted in still other carrying vehicles such as one or more liquid diluents or solvents. For example, water, alcohol, witch hazel and mineral oil or combinations thereof are suitable for admixture with the 2-butanone. Such admixtures can contain up to 50 percent by weight, liquid diluent and the remainder 2-butanone and will give demonstrable relief; however, it is preferred to utilize the 2-butanone in concentrated form.

What is claimed is:

1. A process of treating poison ivy and poison oak on a person suffering therefrom comprising applying topically to the affected skin of said person an effective amount of 2-butanone.

2. The process as claimed in claim 1 wherein said 2-butanone is in admixture with a pharmaceutically acceptable carrier when applied to said skin.

3. The process as claimed in claim 2 wherein said carrier is lanolin.

4. The process as claimed in claim 2 wherein said carrier comprises up to 50 percent by weight of said admixture.

* * * * *